United States Patent [19]

Seelig et al.

[11] Patent Number: 5,333,802

[45] Date of Patent: Aug. 2, 1994

[54] METHOD AND APPARATUS FOR PRODUCING CHUNKS OR KIBBLES OF A FOODSTUFF

[75] Inventors: David L. Seelig, Palmerton; Kevin S. McAfee, Alburtis, both of Pa.

[73] Assignees: Conec, Inc., Palmerton; Air Products and Chemicals, Inc., Allentown, both of Pa.

[21] Appl. No.: 825,236

[22] Filed: Jan. 24, 1992

[51] Int. Cl.⁵ .................. B02C 13/06; B02C 18/06; B02C 18/16

[52] U.S. Cl. .................. 241/65; 2412/243; 2412/300.1; 2412/DIG. 37

[58] Field of Search .................. 242/23, 243, DIG. 37, 242/169.1, 300.1, 65

[56] References Cited

U.S. PATENT DOCUMENTS

| | | | |
|---|---|---|---|
| 1,739,761 | 12/1929 | Kleinfeldt | 241/DIG. 37 |
| 2,297,782 | 10/1942 | Krider | 83/53 |
| 2,398,932 | 4/1946 | Grant | 241/100 |
| 2,583,697 | 1/1952 | Hendry, Jr. et al. | 241/DIG. 37 |
| 2,669,271 | 2/1954 | Treckmann | 146/107 |
| 2,853,247 | 9/1958 | Anderson | 242/190 |
| 2,865,572 | 12/1959 | Lannert | 241/294 |
| 2,963,062 | 12/1960 | Hughes | 241/300.1 |
| 3,151,814 | 10/1964 | Morgan et al. | 241/99 |
| 3,527,277 | 9/1970 | Woods | 146/123 |
| 3,556,421 | 1/1971 | Galanty | 241/86 |
| 3,843,064 | 10/1974 | Suzuki | 241/67 |
| 3,907,215 | 9/1975 | Mantelet | 241/88 |
| 3,957,211 | 5/1976 | Nakamura et al. | 241/73 |
| 4,687,672 | 8/1987 | Vitkovsky | 426/524 |
| 4,742,686 | 5/1298 | Cook | 62/64 |
| 4,753,395 | 6/1988 | Paugh | 242/88.4 |
| 4,801,101 | 1/1989 | Dreyer et al. | 241/240 |
| 4,813,614 | 3/1987 | Moore et al. | 241/23 |
| 4,846,408 | 7/1989 | Sallavanti et al. | 241/18 |
| 4,871,118 | 10/1989 | Maloney | 241/99 |

*Primary Examiner*—Timothy V. Eley
*Assistant Examiner*—John M. Husar
*Attorney, Agent, or Firm*—James C. Simmons; William F. Marsh

[57] ABSTRACT

A method and apparatus for chunking or kibbling foodstuffs by moving the foodstuff through a device adapted to produce individual particles of random shape and size. The invention is characterized by adapting the device or utilizing the process so that the foodstuff is exposed to a liquid cryogen prior to entering the device while the portion of the device producing the particle is simultaneously exposed to the liquid cryogen.

6 Claims, 3 Drawing Sheets

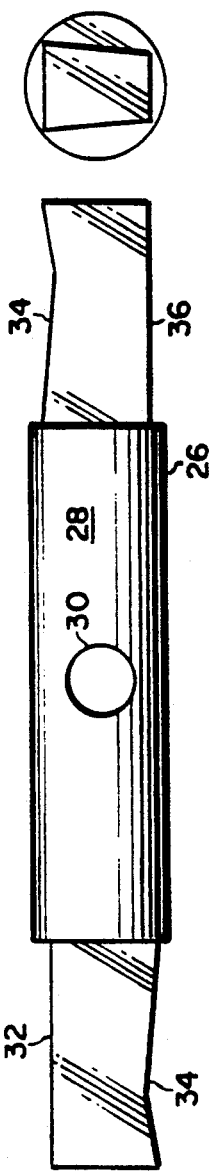

METHOD AND APPARATUS FOR PRODUCING CHUNKS OR KIBBLES OF A FOODSTUFF

FIELD OF THE INVENTION

The present invention pertains to producing kibbles or chunks of solid foodstuffs and, in particular, production of such particles while retaining characteristics of the foodstuff.

BACKGROUND OF THE INVENTION

In the manufacture of foods such as ice cream, it has become increasingly more popular to include chunks or kibbles of another foodstuff into the ice cream. For example, a popular ice cream is called "Cookies and Cream". This ice cream is produced by incorporating pieces of the well-known cookie, which is a sandwich of two cookies with a cream center into the final product. Individual chunks of the cookies are dispersed throughout the ice cream matrix. Other foodstuffs, such as chocolate cups containing peanutbutter, candy pieces and the like, have been used in the production of ice cream.

A problem arises in producing chunks or kibbles of soft and/or meltable foodstuffs by using conventional food grinders. A conventional food grinder of the type employing the cutter and comb principle such as shown in U.S. Pat. No. 3,907,215 and 4,753,395, which produce the chunks or kibbles by a shearing action, can result in the loss in identity of the foodstuff and the resulting product is of poor quality. For example, the product can be turned to the consistency of mush. In grinding or kibbling of fruits, the fruit can be significantly damaged creating an undesirable product. When chunking or kibbling meltable products, such as product-based confections, the heat generated during the grinding process results in broken product that melts to form a glutinous mass which sticks to the cutting teeth of the chunking or grinding device.

Powered tooth and comb cutting or grinding devices have been used in various applications as illustrated by U.S. Pat. Nos. 2,669,271; 2,853,247; 3,151,814 and 4,801,101.

SUMMARY OF THE INVENTION

In order to overcome the problems of producing chunks or kibbles of solid foodstuffs in a cutter and comb-type grinding device, it has been discovered that if the cutters are made with a particular shape, which facilitates bringing the material to be chunked or kibbled into the proper portion of the mill and the material being chunked or kibbled and the cutting mechanism are simultaneously exposed to a liquid cryogen, e.g., nitrogen, the foodstuff can be chunked or kibbled to produce discrete shapes while maintaining the identity of the foodstuff as a chunk or kibble taken from what would be considered to be a whole piece of the foodstuff.

BRIEF DESCRIPTION OF THE DRAWING

FIG. 4 is a front elevational view of a cutting device of the present invention.

FIG. 5 is an end view of the device of FIG. 4.

FIG. 6 is a schematic representation of the interior of the apparatus of the invention illustrating flow of the cryogen.

FIG. 7 is a fragmentary schematic illustrating the overlapping spray pattern of the device of FIG. 6.

DETAILED DESCRIPTION OF THE PREFERRED EMBODIMENT

Figure 1:
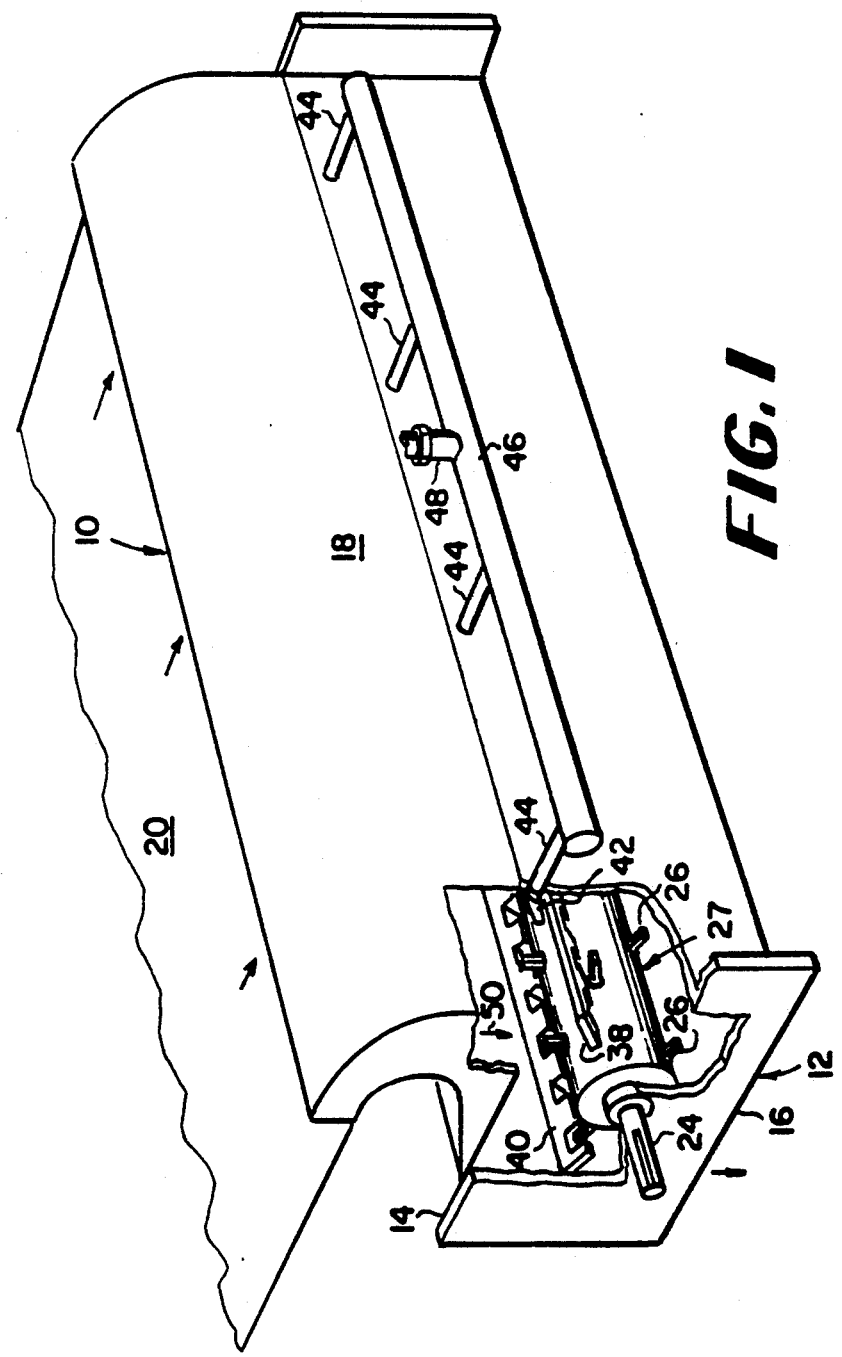
FIG. 1 is an isometric view of a device according to the present invention with a portion broken away to illustrate interior details thereof.

According to the present invention, an apparatus suitable for producing chunks and kibbles of solid foodstuffs is shown as 10 in FIG. 1. The chunker, kibbler or grinder 10 as shown in FIG. 1 includes a housing 12 having an entry end 14 and a discharge end 16. Disposed on the entry end 14 of housing 12 is a directional cover/chute or baffle 18 which directs product from a conveyor belt 20 into the housing 12 so that the product is conducted by gravity from the entry 14 to the exit 16 of the housing 12. Disposed within housing 12 is a cutting assembly which includes a cutting apparatus 22 mounted on a shaft 24. Shaft 24 is disposed transversely in housing 12 so that the product must fall across the axis of rotation of shaft 24 as it moves through the housing 12. Shaft 24 can project through one end of the housing 12 and be adapted for rotation by a motor or other device (not shown). Cutting assembly 22 includes a plurality of cutters or bars 26 shown in detail in FIG. 4. Refering to FIG. 4 each cutter 26 includes a cylindrical body portion 28 which is adapted for mounting on shaft 24 by a centrally located aperture 30. Aperture 30 is located so that the body of the cutter 26 projects equally from each side of the shaft 24. On each end of the body 28 of cutter 26 is a tooth or cutting portion 32. Each cutting portion 32 as shown in FIG. 5 is made so that it has a cross-section generally in the shape of a trapezoid. The cutting portion 32 has on the larger of the two parallel faces of the trapezoid, a grabber or grabbing means or a hook-like section 34. Hook-like section 34 is produced by machining the larger face of the trapezoidal cutting portion 32 so that two planner surfaces intersect at an obtuse angle, such as shown diagrammatically in FIG. 4.

Figure 2:
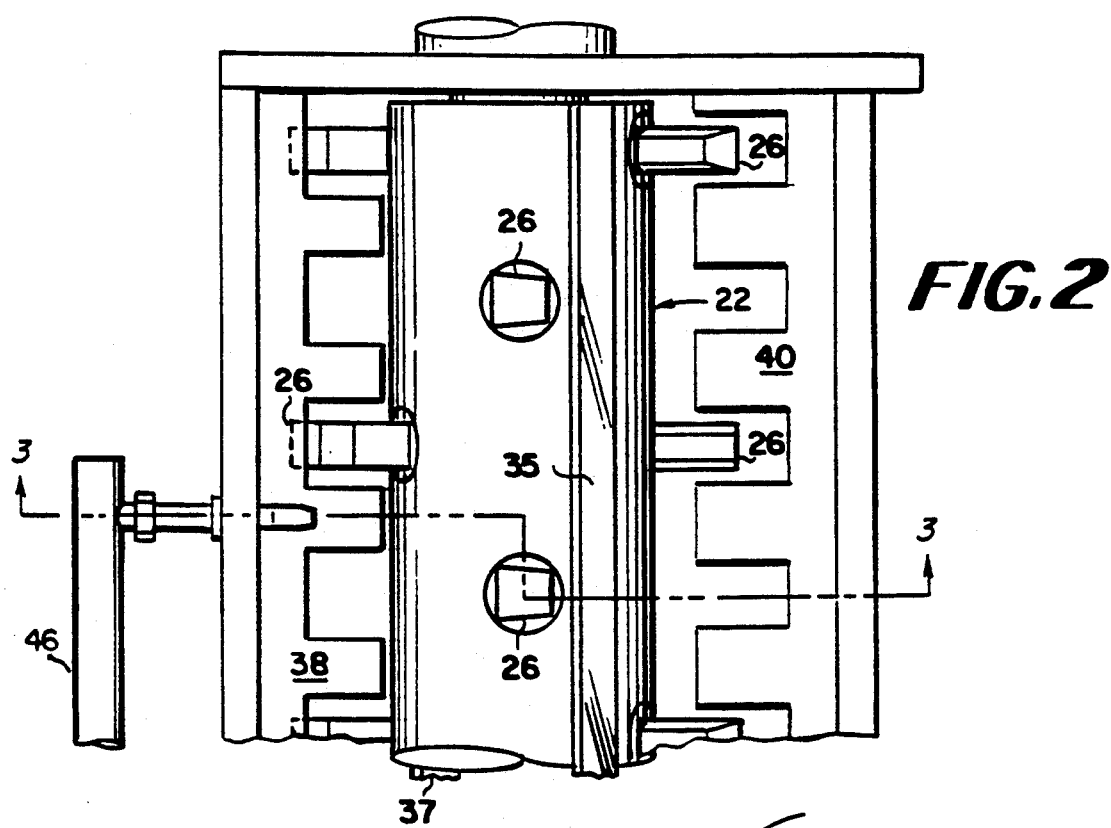
FIG. 2 is an enlarged fragmentary top plan view of the device of FIG. 1 with portions removed for illustration.
Figure 3:
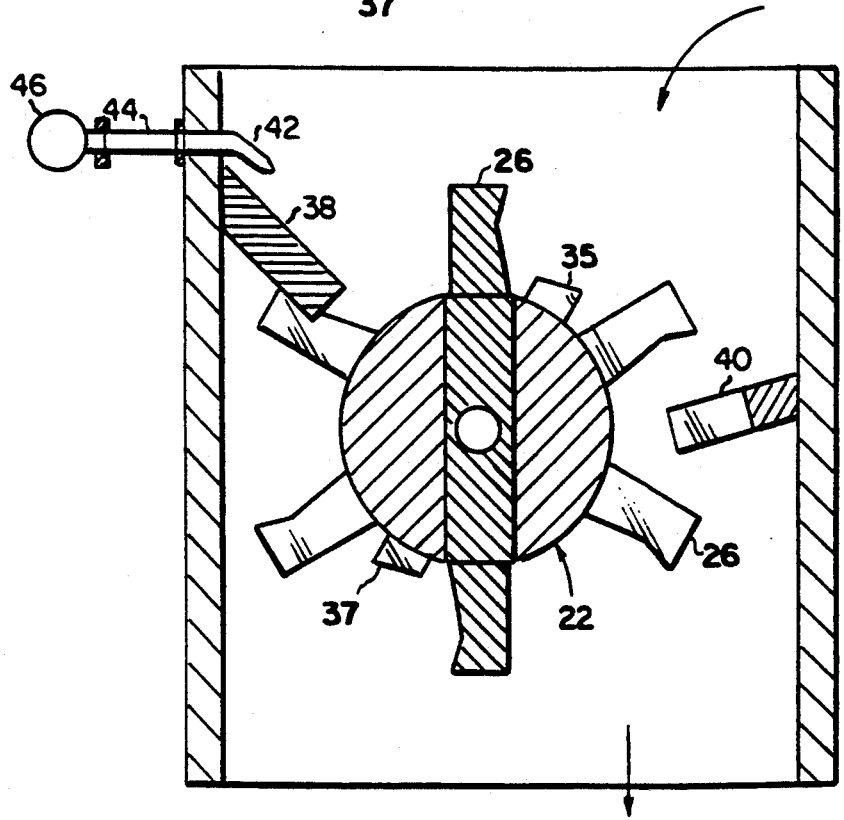
FIG. 3 is a section taken along line 2—2 of FIG. 2.

The cutting assembly 22 includes a sleeve 36 through which the cutters 26 project so that the spacing between the cutters and two comb-like devices 38 and 40 can be used for the cutting or shearing action. The comb-like devices 38 and 40 are made so that the teeth of the comb have a generally rectangular shape. The comb-like sections 38 and 40 are best illustrated in FIGS. 2 and 3. Referring to FIG. 2, the projecting ends of the cutters 26 pass in proximity to the comb-like devices 38 and 40 so that the material to be kibbled or chunked is forced between the cutter 34 and the combs 38 and 40. The hook-like sections 34 of the cutters 26 cause the product to be pulled or directed to effect a cutting, shearing, chunking or kibbling action between the cutter 26 and the combs 38, 40. The combs 38, 40 are fixed to the interior of the housing 12 at an angular relationship to the axis of the shaft 24 and on either side of the housing as shown in FIG. 3. As shown in FIG. 3, a pair of doctor bars or cleaning blades 35, 37 are disposed in the outer surface of cylinder or sleeve 36 to effect removal of built-up of cut product in the comb-like devices 38–40. Blades 35, 37 are disposed longitudinally on opposite sides of the sleeve 36 and extend from opposite ends of sleeve 36 in an overlapping fashion without extending for the length of the sleeve 36. Blades 35, 37 can have a hook-like surface similar to that of cutters 26 fabricated on the longitudinal surface of the blade or bar that passes combs 38, 40 first during rotation of the cutter assembly.

Disposed within the housing are a plurality of spray nozzles 42 which, in turn, are connected to supply pipes 44, which, in turn, are connected to a header pipe 46 and a product delivery pipe 48, which, in turn, is connected to a source of liquid cryogen (not shown). As shown in FIGS. 1, 6 and 7, a plurality of nozzles are spaced equally across the housing 10 so that the liquid cryogen is sprayed (FIG. 6) in a direction that impinges on the cutting apparatus 22 and on the product shown by arrow 50 in FIG. 6 as it passes into the cutting device. Therefore, the product is cooled and the apparatus is cooled, crust freezing the product and preventing melting of the product, changing the cell structure, and thus maintaining the characteristics of the foodstuff being ground. As shown in FIG. 7, the nozzles 42 are arranged so that there is an overlapping spray pattern across the width of the housing 12.

A device according to the present invention was constructed using rows of cutting teeth staggered angularly around the shaft 24 as shown in the drawing. The nozzles 42 were set so that the spray was directed at a downward angle of 25° from the horizontal into the housing 12. Using such a device, peanutbutter-filled chocolate cups were successfully ground into fragments without destroying the characteristics of the peanutbutter cups so that the particles could be recognized. The particles were then used to produce an ice cream product.

A machine according to the present invention is preferably fabricated from stainless steel and the cutters 26, which are sometimes referred to as cutting bars or teeth, are rotated around a horizontal axis by a variable speed drive located outside of the grinding chamber. The cutting bars or teeth fabricated with the hook-like portion are used to grab the foodstuff and direct it into engagement with the combs 38, 40 so that the kibbles or chunks are produced. Liquid nitrogen sprayed inside of the grinder 10 to cool both the product and the cutters 26 prevents the product from being turned to mush or a glutinous mass and achieves the desired results of a kibble or chunk of a larger foodstuff where the identity of the larger foodstuff is maintained.

Having thus described our invention, what is desired to be secured by letters patent of the United States is set forth in the appended claims.

We claim:

1. An apparatus for producing random discrete shapes from solid foodstuffs while retaining the characteristics of the foodstuff comprising in combination:
   a housing having a first or feed end and second or product discharge end, a rotatable shaft disposed within said housing, said shaft mounted for rotation in a transverse direction between said first and second end of said housing, said shaft having a plurality of randomly spaced cutting devices disposed around the periphery of said shaft, said cutting devices comprising at least three rows of teeth of equal length but varying positions, each row placed circumferentially around said shaft in a common plane perpendicular to said shaft, said teeth including means to grab said foodstuff and direct it into engagement between said teeth and a comb-like plate;
   at least one comb-like plate mounted within said housing and adapted to mesh with said cutting devices without touching said cutting devices as they rotate;
   means on said shaft to remove product build-up from said comb-like plate;
   means disposed on said first end of said housing for directing foodstuffs into said housing and into contact with said cutting devices;
   means for introducing a liquid cryogen into said housing, said means adapted to direct said liquid cryogen simultaneously into said cutting device, said comb-like plate and said foodstuff as it enters said hopper prior to contacting said cutting devices; and
   means to rotate said shaft at varying speeds.

2. An apparatus according to claim 1 wherein said product directing means disposed on said first end of said housing for directing processed foodstuffs for grinding is a hopper-like device.

3. A grinding machine comprising in combination:
   a housing having a generally open first or feed end and a generally open second or discharge end;
   a cutting assembly disposed within said housing between said feed end and said discharge end, said cutting assembly being of the cutter and comb-type wherein the comb portion has teeth having a generally rectangular shape and said comb is fixed to said housing, said cutters being in the form of bars carried on a shaft with each of said cutters disposed at an angular off-set from adjacent cutters perpendicular to the axis of rotation of said shaft, each of said cutters positioned to mesh with a space between the teeth of said comb to effect the grinding action;
   means on the distal end of each cutter to position and hold the material to be ground for cutting by passage of the cutter through the comb said means being each cutter having a generally trapezoidal cross-section with the bases of the trapezoid positioned for movement through the teeth of the comb in a direction generally perpendicular to the longitudinal axis of the comb with a hook-like portion formed in the base of the trapezoidal portion of each cutter that would, during rotation, pass the comb first; and
   means to remove product build-up from the comb portion.

4. A grinding machine according to claim 3 wherein the larger base of the trapezoidal portion has the hook-like portion formed therein.

5. A grinding machine according to claim 4 wherein the cutter is mounted on the shaft so that the larger base of the trapezoidal portion would, during rotation, pass the comb first.

6. A cutter for a grinding machine comprising in combination;
   a generally cylindrical shaped body portion adapted for rotation by a shaft disposed perpendicular to the mid-point of the longitudinal axis of said body;
   a cutting end disposed on each end of said body, each cutting end having a cross-section in the shape of a trapezoid and each cutting end being of equal length, each of said cutting ends including a hook-like portion formed in a base portion of the trapezoid said hook-like portion is formed by two intersecting planes formed in the larger base of the trapezoid bases.

* * * * *